United States Patent
Wilson

(10) Patent No.: US 10,104,877 B2
(45) Date of Patent: Oct. 23, 2018

(54) EXPANDING OR CONTRACTING FISHING LURE

(71) Applicant: Joseph W. Wilson, Hudson, IA (US)

(72) Inventor: Joseph W. Wilson, Hudson, IA (US)

(73) Assignee: Joe Wilson Designs, LLC

( * ) Notice: Subject to any disclaimer, the term of this patent is extended or adjusted under 35 U.S.C. 154(b) by 182 days.

(21) Appl. No.: 15/341,535

(22) Filed: Nov. 2, 2016

(65) Prior Publication Data
US 2017/0049087 A1 Feb. 23, 2017

Related U.S. Application Data

(63) Continuation-in-part of application No. 14/814,803, filed on Jul. 31, 2015, which is a continuation-in-part of application No. 13/830,394, filed on Mar. 14, 2013, now Pat. No. 9,149,028.

(51) Int. Cl.
| | |
|---|---|
| *A01K 85/00* | (2006.01) |
| *A01K 85/02* | (2006.01) |
| *A01K 85/16* | (2006.01) |
| *A01K 91/04* | (2006.01) |
| *A01K 85/01* | (2006.01) |

(52) U.S. Cl.
CPC .............. *A01K 85/02* (2013.01); *A01K 85/00* (2013.01); *A01K 85/01* (2013.01); *A01K 85/16* (2013.01); *A01K 91/04* (2013.01)

(58) Field of Classification Search
CPC ........ A01K 85/00; A01K 85/02; A01K 85/16; A01K 91/14
USPC ...................... 43/42.24, 42.26, 44.87, 42.02
See application file for complete search history.

(56) References Cited

U.S. PATENT DOCUMENTS

| | | | |
|---|---|---|---|
| 559,293 | A | 4/1896 | Kitchen |
| 2,290,433 | A | 7/1942 | Jeffers |
| 2,572,608 | A | 10/1951 | William |
| 2,722,766 | A | 11/1955 | Accetta |
| 2,769,268 | A | 11/1956 | Miller |
| 2,932,112 | A | 4/1960 | Graves, Jr. |
| 2,955,378 | A | 10/1960 | Burke |
| 2,979,849 | A | 4/1961 | Anderson, Jr. |
| 3,031,791 | A | 5/1962 | Banks |
| 3,224,133 | A | 12/1965 | Arsene |
| 3,380,184 | A | 4/1968 | Fernandez |
| 3,544,204 | A | 12/1970 | Bienefeld |
| 4,208,822 | A | 6/1980 | Bryant |
| 4,367,607 | A | 1/1983 | Hedman |
| 4,653,212 | A | 3/1987 | Pixton |
| 5,142,811 | A | 9/1992 | Freeman |
| 5,794,376 | A | 8/1998 | Frizzell et al. |
| 6,115,956 | A | 9/2000 | Firmin |
| 6,760,996 | B1 | 4/2004 | Pierson |
| 6,763,631 | B1 | 7/2004 | Santini |

(Continued)

*Primary Examiner* — Richard T Price, Jr.
(74) *Attorney, Agent, or Firm* — Luke Charles Holst; McGrath North Mullin & Kratz, PC LLO

(57) ABSTRACT

The present invention relates in general to fishing lures, and more specifically, to an expanding or contracting fishing lure that provides a natural movement that mimics live bait. The fishing lure is configured so that when the fishing lure is retrieved (e.g., reeled in) or jigged by an angler, or the fishing line is pulled or twitched, the fishing lure transitions from a first position to a second position and then returns to the first position. The purpose of the invention is to provide a fishing lure that will successfully attract fish by displaying a unique action in the water.

20 Claims, 9 Drawing Sheets

(56) References Cited

U.S. PATENT DOCUMENTS

| | | |
|---|---|---|
| 6,843,017 B1 | 1/2005 | Chambers |
| 6,860,058 B2 | 3/2005 | Ito |
| 7,913,445 B2 | 3/2011 | St. Germain |
| 8,341,872 B2 | 1/2013 | Ellard |
| 2010/0101137 A1 | 4/2010 | MacDonald |
| 2011/0197493 A1 | 8/2011 | Kwong et al. |
| 2012/0285069 A1 | 11/2012 | Baumgardner et al. |

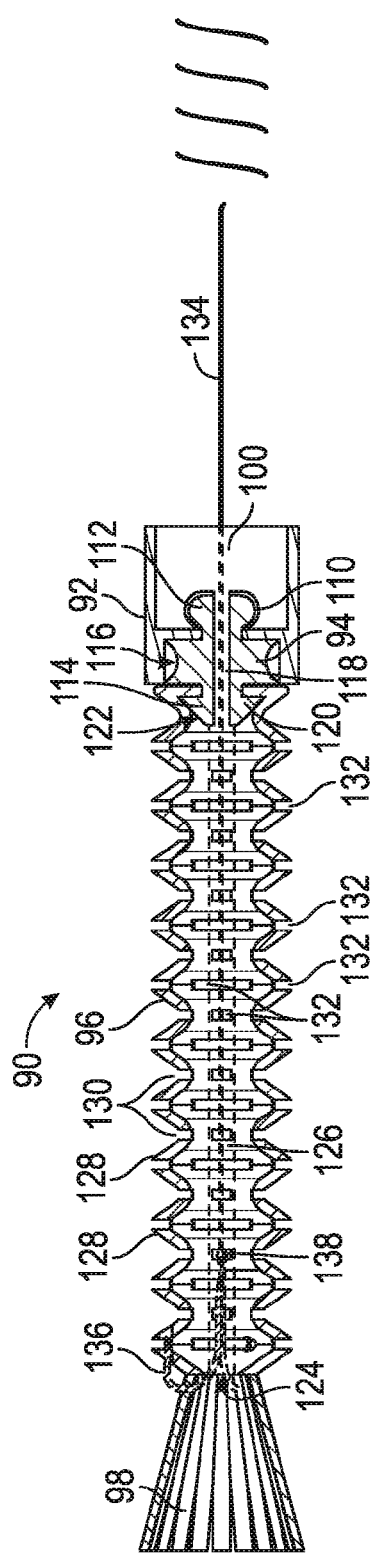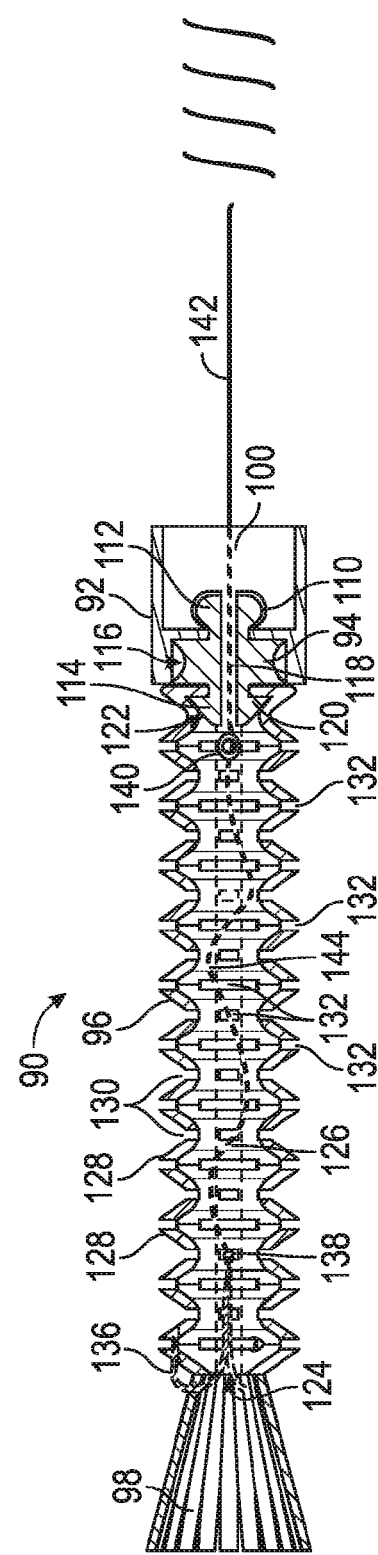

EXPANDING OR CONTRACTING FISHING LURE

CROSS REFERENCE TO RELATED APPLICATIONS

This application is a continuation-in-part of U.S. patent application Ser. No. 14/814,803 filed Jul. 31, 2015, which is a continuation-in-part of U.S. patent application Ser. No. 13/830,394 filed Mar. 14, 2013, herein incorporated by reference in their entirety.

FIELD OF THE INVENTION

The present invention relates in general to fishing lures, and more specifically, to an expanding or contracting fishing lure that provides a natural movement that mimics live bait. The purpose of the invention is to provide a fishing lure that will better attract fish by displaying a noticeable and unique action in the water.

BACKGROUND OF THE INVENTION

A fishing lure is an artificial object tied onto the end of a fishing line and used to attract fish. Used in conjunction with a fishing rod and fishing reel, a skilled angler casts and retrieves the fishing lure to mimic a swimming, waddling, dropping, pulsing, twitching, fizzing or popping action to imitate prey as it moves through the water. An angler may also utilize a jigging action wherein the fishing lure is dropped into the water and vertically moved, or jigged, up and down via the attached fishing line. The fishing lure is designed to resemble the prey of a particular type of fish: earthworms, caterpillars, grubs, frogs, crawfish, minnows, lizards, and insects. The color, appearance, vibration, and movement of the fishing lure as it travels through the water attract the attention of fish, inciting fish to bite the lure. Fishing lures are further equipped with a single, double, treble or quad hook(s) of various sizes, shapes, and spacing. The hooks become embedded in the fish after the fishing lure has been bitten or swallowed by the fish.

Historically, fish hooks were carved by ancient man out of bone or molded out of bronze. The Greek and Roman civilizations advocated fishing for sport, creating fly-fishing lures of feathers, bronze, horsehair, and wild boar bristles. In the United States during the early 1800s, fishing lures were made by individual craftsmen whittling wood or pounding metal into a shape that resembled live bait. However, the unnatural movement of these lures as they traveled through the water left much to be improved upon. Manufacturing of fishing lures began to slowly evolve from individual craftsmen to commercial ventures during the late 1800s to early 1900s. More recently, the development of soft plastic compositions and injection molding techniques have produced fishing lures that more closely resemble live bait. Soft plastic baits encompass a variety of different lures, such as soft swimbaits with square or paddletails, stickbaits and worms, and creature baits. Generally, soft plastic baits comprise a solid, flexible plastic tube. Tentacles, fins, legs, claws, antennas, tails, and other types of appendages may be incorporated into the design to resemble particular types of fish prey. A hook is typically pierced through the lure, after which an angler casts and retrieves the lure utilizing various motions in an attempt to imitate live bait swimming through the water. While such a lure has its own advantages, a significant disadvantage remains as the solid, plastic tube does not independently move while it is drawn through the water as compared to live bait.

Thus, a desire remains to further develop soft plastic baits that incorporate unique natural movements while offering a concealed position for the hook(s) to attract fish and make it easier to set the lure in a fish's mouth.

BRIEF SUMMARY OF THE INVENTION

Therefore, it is a principal object, feature, and/or advantage of the present invention to overcome the aforementioned deficiencies in the art and provide a fishing lure that incorporates unique natural movements to more closely resemble live bait.

A further object, feature, and/or advantage of the present invention is to provide a life-like fishing lure that significantly expands and/or contracts in overall length to attract the attention of fish.

Another object, feature, and/or advantage of the present invention is to provide a fishing lure that simulates the muscular contraction and/or expansion of creatures that crawl and swim in the water.

Yet another object, feature, and/or advantage of the present invention is to provide a fishing lure that offers a concealed position for a single, double, treble or quad hook(s).

A still further object, feature, and/or advantage of the present invention is to provide a fishing lure that may act as a weedless lure.

Another object, feature, and/or advantage of the present invention is to provide a fishing lure with multiple-attractive aspects (e.g., color, light, turbulence in the water, scent, undulation, vibration) when pulled through the water.

Another object, feature, and/or advantage of the present invention is to provide a fishing lure that easily attaches to a fishing line.

A further object, feature, and/or advantage of the present invention is to provide a fishing lure that is easy to manufacture and easy to use.

Another object, feature, and/or advantage of the present invention is to provide a fishing lure that may be used as a topwater lure, a midwater lure, and/or a bottom lure.

A still further object, feature, and/or advantage of the present invention is to provide a fishing lure that may be used when casting, trolling, and/or jigging.

Yet another object, feature, and/or advantage of the present invention is to provide a fishing lure with an insert that may be conveniently used to attach the head portion to the body portion of the fishing lure.

A further object, feature, and/or advantage of the present invention is to provide a fishing lure with an insert that maintains the fishing line in a straight configuration inside the fishing lure to reduce sideways deflection of the fishing lure while traveling through water.

Yet another object, feature, and/or advantage of the present invention is to provide a fishing lure kit with interchangeable head, body and tail portions of various shapes, sizes and colors to enable a fisherman to design his/her fishing lure to better attract fish.

A still further object, feature, and/or advantage of the present invention is to provide a method of catching fish using a fishing lure that provides natural movement to mimic live bait.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a contracting fishing lure is formed having a head portion, a body portion, and a tail portion. A channel extends longitudinally through the lure, configured for water to flow through the lure by passing through the body portion and exiting through the tail portion. The body portion may be comprised of elastic material and have a series of flexible ridges and valleys extending around the body portion. The fishing lure is configured such that a fishing line may be drawn through an opening in the head portion, extend through the channel of the body portion, continue beyond the tail portion, and attach to a fishing hook. The fishing lure is further configured such that when the fishing lure is retrieved (e.g., reeled in) or jigged by an angler, or the fishing line is pulled or twitched, the fishing lure significantly and noticeably contracts in overall length by the series of flexible ridges and valleys to mimic the natural movement of live bait to attract fish, resembling an accordion motion. In a variation of this aspect of the invention, the body portion may have a series of longitudinal cuts. The longitudinal cuts may extend along a portion of the length of the body portion, thus forming a plurality of longitudinal strips. The plurality of longitudinal strips may extend outwards as the fishing lure is drawn through water, wherein the fishing lure significantly contracts in overall length to mimic the natural movement of live bait to better attract fish while the fishing lure is retrieved or jigged by an angler.

According to another aspect of the present invention, a contracting fishing lure is formed having a head portion, a body portion, and a tail portion. A channel extends longitudinally through the lure, configured for water to flow through the lure by passing through the head portion, the body portion, and exiting through the tail portion. The head portion may be cup-shaped, bowl-shaped, or flat-shaped. The head portion may also be larger in diameter than the body portion, the same diameter as the body portion, or smaller in diameter than the body portion. The head portion is adjacent the body portion, wherein the head portion comprises an opening aligned with the channel. The body portion may be comprised of elastic material and have a series of flexible ridges and valleys extending around the body portion. The fishing lure is configured such that a fishing line may be drawn through the opening in the head portion, extend through the channel of the body portion, continue beyond the tail portion, and attach to a fishing hook. The fishing lure is configured such that when the lure is retrieved (e.g., reeled in) or jigged by an angler, or the fishing line is pulled or twitched, the fishing lure significantly and noticeably contracts in overall length by the series of flexible ridges and valleys to mimic the natural movement of live bait to attract fish, resembling an accordion motion. The contraction is magnified by the increased resistance exerted by the cup, bowl, or flat-shaped head portion against the water as the fishing lure is retrieved or jigged by an angler.

According to yet another aspect of the present invention, an expanding fishing lure is formed having a head portion, a body portion, a tail portion, a stop, a swivel, a first fishing line, and a second fishing line. A channel extends longitudinally through the lure, configured for water to flow through the lure by passing through the body portion and exiting through the tail portion. The head portion is adjacent the body portion, wherein the head portion comprises the stop and an opening aligned with the channel. The body portion may be comprised of elastic material and have a series of flexible ridges and valleys extending around the body portion. The tail portion may be cup-shaped, bowl-shaped, or flat-shaped. The tail portion may also be larger in diameter than the body portion, the same diameter as the body portion, or smaller in diameter than the body portion. The fishing lure is configured such that the first fishing line may be attached to one end of the swivel, ring, or other attachment device and the second fishing line attached to an opposite end of the swivel, ring, or other attachment device. The stop prevents the swivel, ring, or other attachment device from being pulled completely through the opening in the head portion as an angler is casting and/or retrieving the expanding fishing lure. The second fishing line is drawn through the channel of the body portion, continued beyond the tail portion, wherein it is attached to a fishing hook. It would be typical for the hook to be buried in the body with extra line inside the body to allow expansion of the lure when pulled. The fishing lure is configured such that when the lure is retrieved (e.g., reeled in) or jigged by an angler, or the fishing line is pulled or twitched, the fishing lure significantly and noticeably expands in overall length by the series of flexible ridges and valleys to mimic the natural movement of live bait to attract fish, resembling an accordion motion.

According to another aspect of the present invention, a contracting or expanding fishing lure is formed having a head portion, at least one insert, a body portion, and a tail portion. The insert is configured to removably attach the head portion to the body portion by press-fitting or snapping together. The insert is also configured to maintain a fishing line in a straight configuration inside the fishing lure to reduce sideways deflection of the fishing lure while traveling through water. The fishing lure is configured such that when the lure is retrieved (e.g., reeled in) or jigged by an angler, or the fishing line is pulled or twitched, the fishing lure significantly and noticeably contracts or expands in overall length by the series of flexible ridges and valleys to mimic the natural movement of live bait to attract fish, resembling an accordion motion. It is contemplated that a plurality of different shapes, sizes and colors of head portions, body portions and tail portions may be utilized and interchanged in the fishing lure to create an infinite number of possible configurations that may be sold separately and/or incorporated as such into kits.

According to a further aspect of the present invention a method of fishing using a fishing lure is provided. The method includes providing a fishing rod and reel with a fishing line. The method further includes providing an expanding or contracting fishing lure and a stringing tool. The method additionally includes attaching the fishing lure to the fishing line using the stringing tool and concealing a fishing hook in a tail portion of the fishing lure. The method further includes casting and retrieving the fishing lure in a manner so that the fishing lure expands or contracts to mimic the natural movement of live bait to attract fish.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIGS. 1-17 represent examples of contracting fishing lures of the present invention, and a method of fishing utilizing the present invention.

FIG. 1 is an exploded assembly view of a contracting fishing lure of the present invention.

FIG. 2 is a non-contracted view of the fishing lure of FIG. 1.

FIG. 3 is a contracted view of the fishing lure of FIG. 1.

FIG. 4 is an exploded assembly view of a contracting fishing lure of the present invention.

FIG. 5 is a non-contracted view of the fishing lure of FIG. 4.

FIG. 6 is a contracted view of the fishing lure of FIG. 4.

FIG. 7 is top-side view of a contracting fishing lure of the present invention.

FIG. 8 is a non-contracted view of the fishing lure of FIG. 7.

FIG. 9 is a contracted view of the fishing lure of FIG. 8.

FIG. 10 is a non-expanded view of an expanding fishing lure of the present invention.

FIG. 11 is a view of a portion of an expanding fishing lure of the present invention that may be used for topwater fishing.

FIG. 12 is a view of a portion of an expanding fishing lure of the present invention that may be used for midwater or bottom fishing.

FIG. 13 is an expanded view of the fishing lure of FIG. 9.

FIG. 14 is an exploded assembly view of a contracting or expanding fishing lure of the present invention.

FIG. 15 is an assembled, cross-sectional view of the contracting or expanding fishing lure of FIG. 14 configured to contract.

FIG. 16 is an assembled, cross-sectional view of the contracting or expanding fishing lure of FIG. 14 configured to expand.

FIG. 17 is a view of a stringing tool.

DETAILED DESCRIPTION OF THE INVENTION

Figure 1:
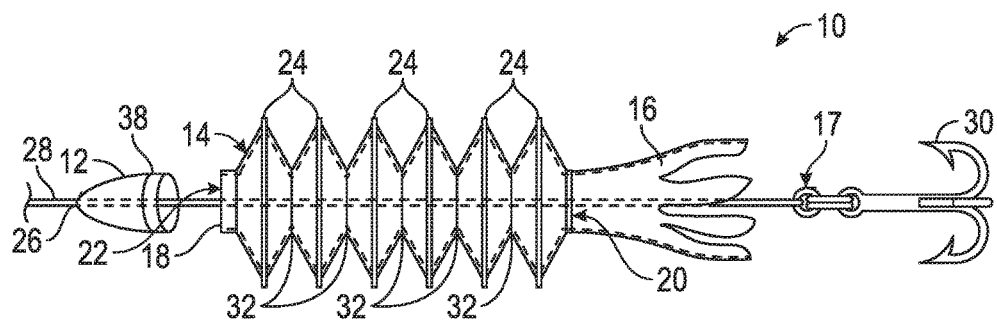

FIG. 1 illustrates an exploded assembly view of one aspect of a contracting fishing lure (10) of the present invention. The contracting fishing lure (10) has a head portion (12), a body portion (14), and a tail portion (16). The head portion (12) may comprise a sinker, a weight, or a light-weight material that floats (e.g., plastic, wood, etc.). The head portion (12) may be rounded in shape, flat, tapered to a point, bullet-shaped, and/or resemble a particular fish prey. The head portion (12) may further comprise a spinner, a bill, a lip, and/or a bib. The head portion (12) includes an opening (26) extending through the head portion (12). The head portion (12) may reside adjacent the body portion (14), wherein the head portion (12) and body portion (14) may be separate, integral, or the head portion (12) removed. Moreover, the head portion (12) may move independently from the body portion (14).

As further shown in FIG. 1, the body portion (14) has a first open end (18) and an opposite second open end (20) exiting into the adjacent tail portion (16). A channel (22) extends longitudinally through the body portion (14) from the first open end (18) to the second open end (20). The channel (22) is configured for water to flow into the first open end (18), through the body portion (14), and exit the second open end (20) into the tail portion (16). The body portion (14) may be a continuous hollow tube, wherein the tubular design is not limited to a circle diameter but may comprise diametrical shapes such as a square, oval, pentagon, octagon, or others. The body portion (14) may be comprised of elastic material and may have a series of flexible ridges (24) and valleys (32) extending around the body portion (14), resembling an accordion and/or caterpillar.

The tail portion (16) may be in the form of tentacles, a sickle, a plurality of segments, a fin or a plurality of fins, a plurality of elongated streamers forming a skirt, a plurality of legs, a plurality of claws, a plurality of antennas, a tail, any combination of the foregoing, and/or other types of appendages that resemble fish prey commonly used in the industry. The tail portion (16) may be optional, wherein the fishing lure (10) may be fished without a tail (16). The tail portion (16) may also be interchanged with the head portion (12) in the fishing lure (10).

Figure 2:
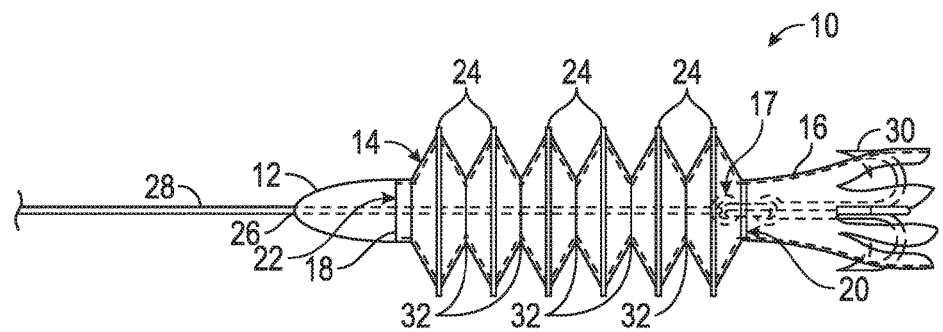
Figure 3:
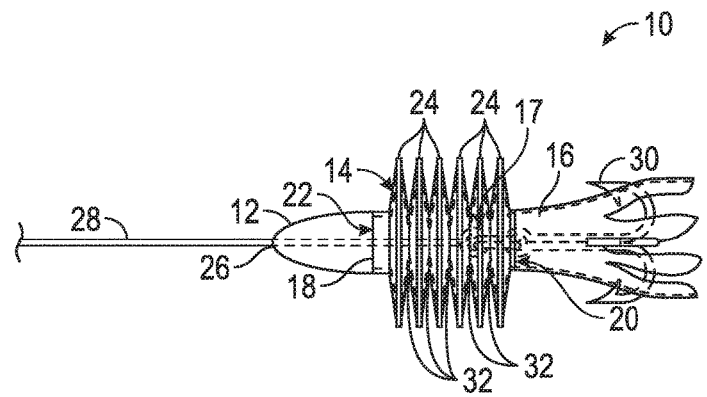

As illustrated in FIGS. 1-3, a fishing line (28) is drawn through the opening (26) in the head portion (12), through the first open end (18) of the body portion (14), further through the channel (22) of the body portion (14), continued through the second open end (20), and extended beyond the tail portion (16) where it is attached to a fishing hook (30) via a means of attachment (17) (e.g., by a fishing knot, ring, snap, or other means of attaching a fishing hook commonly used in the fishing industry). The fishing hook (30) may be a single, double, treble or quad hook(s). As illustrated in FIG. 2, the fishing hook (30) may extend outside a diameter of the body portion (14). Alternatively, the fishing hook (30) may be concealed by the tail portion (16) so that the fishing lure (10) appears more life-like. The contracting fishing lure (10) may also act as a weedless lure by embedding barbs of the fishing hook (30) into the body portion (14) and/or concealing the hook in the tail portion. The fishing hook (30) may also be weighted to assist in vertical jigging. A person skilled in the art will recognize that various sizes of body portions, weights, and hooks may be fabricated and utilized for different types and sizes of fish.

The first open end (18) of the body portion (14) may be smaller in diameter than the second open end (20). The head portion (12) may be partially or fully inserted into the first open end (18) of the body portion (14) so that the head portion (12) and the body portion (14) are integral and do not separate when the fishing lure (10) is cast and retrieved, or jigged. The smaller diameter of the first open end (18) of the body portion (14) allows it to fit tightly around the head portion (12) for a secure fit and seal. The head portion (12) may further comprise a groove (38) extending around the head portion (12) to assist in securing the first open end (18) of the body portion (14) around the head portion (12). Alternatively, the fishing lure (10) of the present invention may be used as a topwater lure by removing the head portion (12) or using a head portion (12) comprised of light-weight material that floats (e.g., plastic, wood, etc.).

The contracting fishing lure (10) is configured so that when it is cast and retrieved (e.g., reeled in) by an angler, the head portion (12) leads and water flows through the channel (22) of the body portion (14) in a direction opposite to the direction in which the fishing (10) lure travels through the water. While lying in the water and the fishing line (28) is slack, the fishing lure (10) assumes a non-contracted first position as depicted in FIG. 2. While moving through the water after tension or force has been placed on the fishing line (28) (e.g., the fishing lure (10) is reeled in by the angler, or the fishing line (28) is pulled, twitched, jerked, or yanked), the fishing lure (10) transitions to a contracted second position where the series of flexible ridges (24) and valleys (32) contract or squeeze together, as illustrated in FIG. 3. When the fishing line (28) becomes slack once again, the fishing lure (10) returns to the non-contracted first position as depicted in FIG. 2, thus, mimicking the natural movement of live bait to attract fish. Because the fishing lure (10) fills with water as it enters the water, water rushes in and out of the fishing lure (10) via the transition from the non-contracted first position to the contracted second position and back to the non-contracted first position. The contracting fishing lure (10) attracts fish by transitioning from the non-contracted first position to the contracted second position before a fish bites or strikes the contracting fishing lure (10), although the fish may bite or strike the contracting fishing lure (10) at any time. The fishing lure (40) of the present invention may also be retrieved in a "walk the dog" fashion which would cause a darting side-to-side action.

There is a significant difference in overall length of the contracting fishing lure (10) between the non-contracted first position (FIG. 2) and the contracted second position (FIG. 3) to better attract fish. For instance, the overall length of the contracting fishing lure (10) in the non-contracted first position may decrease 25-75% as it transitions to the contracted second position. Thus, the overall length of the contracting fishing lure (10) in the contracted second position may be 25-75% less than the overall length of the contracting fishing lure (10) in the non-contracted first position. This significant difference in overall length of the contracting fishing lure (10) between the non-contracted first position and the contracted second position may cause the flexible ridges (24) to touch and the valleys (32) to disappear. A further example of this significant difference in overall length may be demonstrated by the location of the means of attachment (17) for the fishing line (28) to the fishing hook (30). As illustrated in FIG. 2, the means for attachment (17) is located towards the tail end of body portion (14) while the contracting fishing lure (10) is in the non-contracted first position. However, as illustrated in FIG. 3, the means for attachment (17) extends further into and towards the middle of body portion (14) while the contracting fishing lure (10) is in the contracted second position. This notable location change for the means of attachment (17) further demonstrates the significant difference in overall length of the fishing lure (10) between the non-contracted first position and the contracted second position. The series of flexible ridges (24) and valleys (32) are important to the design of the contracting fishing lure (10) of the present invention by creating an accordion-like movement that maximizes the size of contraction and causes the contracting fishing lure (10) to significantly decrease in overall length to better attract fish.

Figure 4:
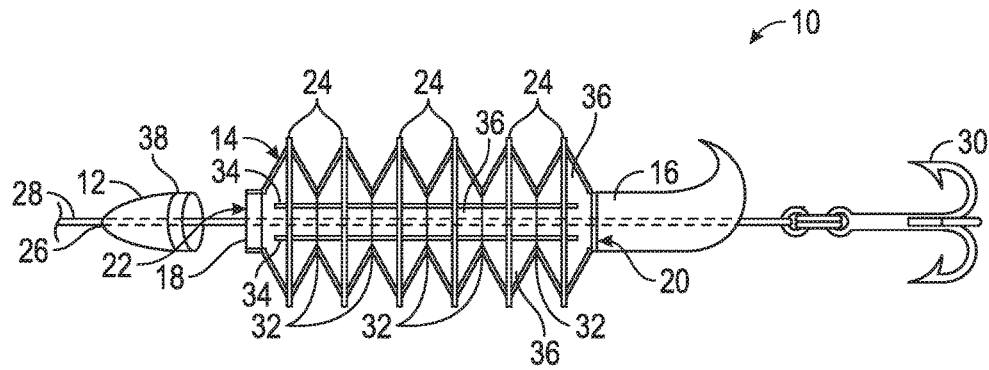
Figure 5:
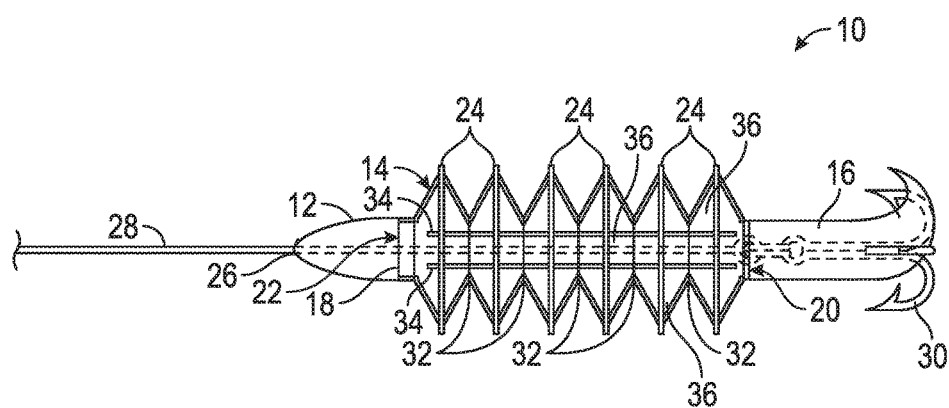
Figure 6:
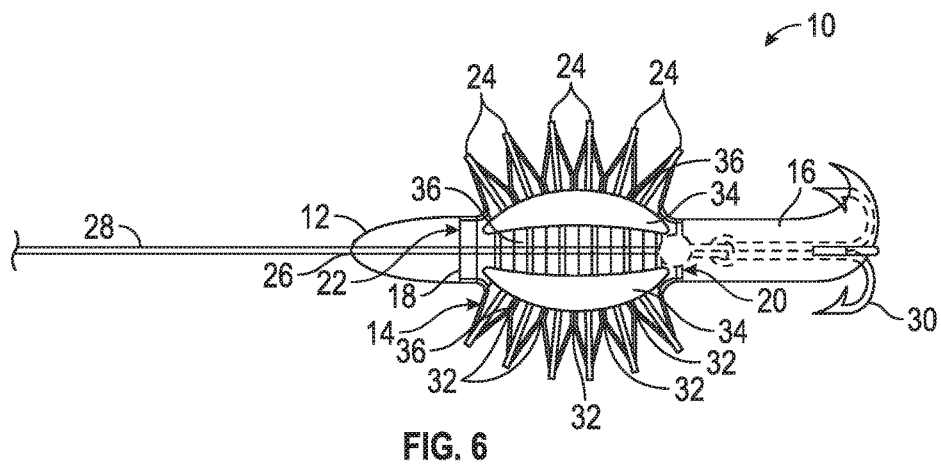

FIGS. 4-6 illustrate a variation of this aspect of the present invention. As shown in FIG. 4, body portion (14) may have a series of longitudinal cuts (34). The longitudinal cuts (34) may extend along a portion of the length of the body portion (14), thus forming a plurality of longitudinal strips (36). After tension or force has been placed on the fishing line (28) by an angler, the contracting fishing lure (10) transitions from a non-contracted first position (FIG. 5) to a contracted second position (FIG. 6) where the plurality of longitudinal strips (36) extend outwards and the overall length of the contracting fishing lure (10) shortens significantly. When the fishing line (28) becomes slack once again, the contracting fishing lure (10) returns to the non-contracted first position (FIG. 5), thus, mimicking life-like movements to attract fish. Alternatively, the body portion (14) may have a series of cuts extending partially around a diameter of the body portion (14), allowing the body portion (14) to easily collapse from the non-contracted first position (FIG. 5) to the contracted second position (FIG. 6).

Figure 7:
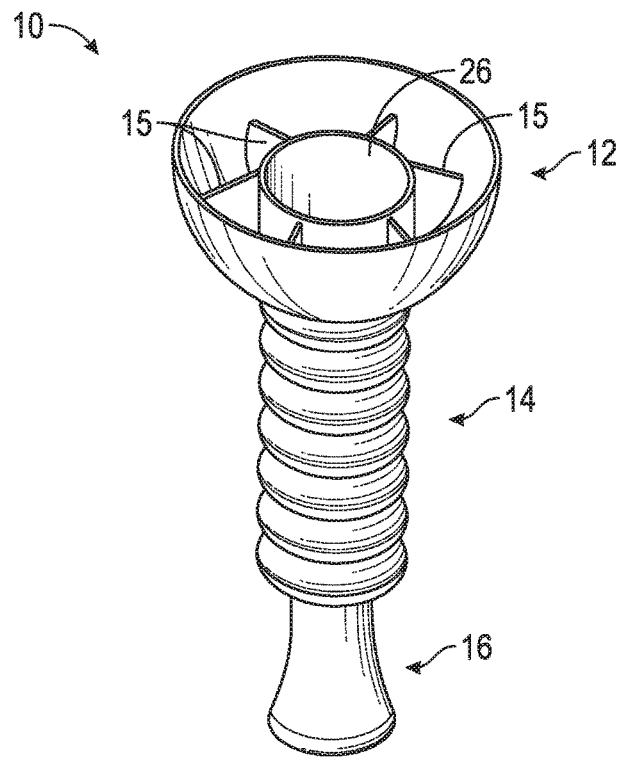

FIG. 7 illustrates a non-contracted view of another aspect of a contracting fishing lure (10) of the present invention. The contracting fishing lure (10) has a head portion (12), a body portion (14), and a tail portion (16). The head portion (12) may be cup-shaped, bowl-shaped, or flat-shaped. A diameter of the head portion (12) may be up to ten times larger than a diameter of the body portion (14) to increase water resistance as the fishing lure is drawn through water. The head portion (12) may also be the same diameter as the body portion (14) or smaller in diameter than the body portion (14). The head portion (12) may be strengthened to include a plurality of reinforcing ribs, thick walls, and/or rigid or semi-rigid materials (15). The head portion (12) includes an opening (26) extending through the head portion (12). The head portion (12) may reside adjacent the body portion (14), wherein the head portion (12) and the body portion (14) may be separate or integral. Moreover, the head portion (12) may move independently from the body portion (14).

Figure 8:
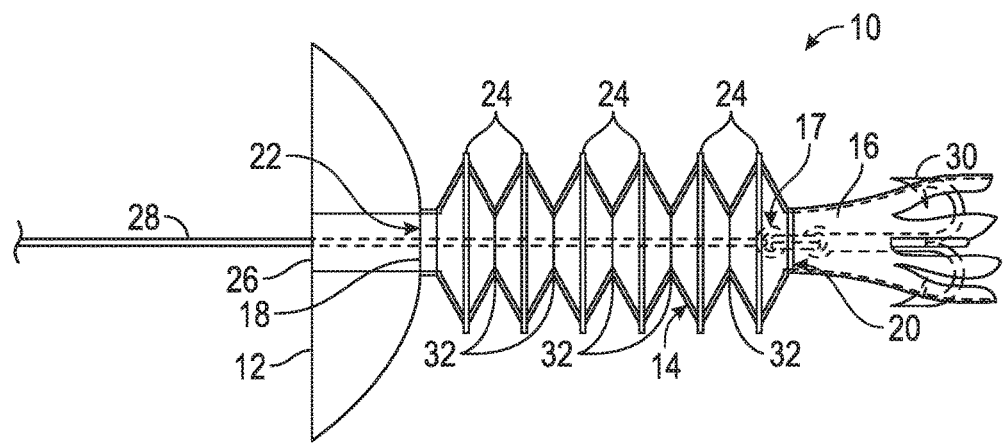

As further shown in FIG. 8, the body portion (14) has a first open end (18) and an opposite second open end (20) exiting into the adjacent tail portion (16). The opening (26) in the head portion (12) may be aligned with the first open end (18) of the body portion (14). The opening (26) in the head portion (12) may be smaller in diameter than the first open end (18) of the body portion (14) to center a fishing line (28) inside the body portion (14). A channel (22) extends longitudinally through the tubular body portion (14) from the first open end (18) to the second open end (20). The channel (22) is configured for water to flow into the opening (26) in the head portion (12), through the first open end (18) of the body portion (14), continue through the tubular body portion (14), and exit the second open end (20) into the tail portion (16). The body portion (14) may be a continuous hollow tube, wherein the tubular design is not limited to a circle diameter but may comprise diametrical shapes such as a square, oval, pentagon, octagon, or others. The body portion (14) may be comprised of elastic material and may have a series of flexible ridges (24) and valleys (32) extending around the body portion (14), resembling an accordion and/or caterpillar.

The tail portion (16) may be in the form of tentacles, a sickle, a plurality of segments, a fin or a plurality of fins, a plurality of elongated streamers forming a skirt, a plurality of legs, a plurality of claws, a plurality of antennas, a tail, any combination of the foregoing, and/or other types of appendages that resemble fish prey commonly used in the industry.

Illustrated in FIG. 8, the fishing line (28) is drawn through the opening (26) in the head portion (12), through the first open end (18) of the body portion (14), further through the channel (22) of the body portion (14), continued through the second open end (20), and extended beyond the tail portion (16) where it is attached to a fishing hook (30) via a means of attachment (17) (e.g., by a fishing knot, ring, snap, or other means of attaching a fishing hook commonly used in the fishing industry). The fishing hook (30) may be a single, double, treble or quad hook(s). The fishing hook (30) may extend outside a diameter of the body portion (14). Alternatively, the fishing hook (30) may be concealed by the tail portion (16) so that the fishing lure (10) appears more life-like. The contracting fishing lure (10) may also act as a weedless lure by embedding barbs of the fishing hook (30) into the body portion (14). The fishing hook (30) may also be weighted to assist in vertical jigging. A person skilled in the art will recognize that various sizes of body portions, weights, and hooks may be fabricated and utilized for different types and sizes of fish.

Figure 9:
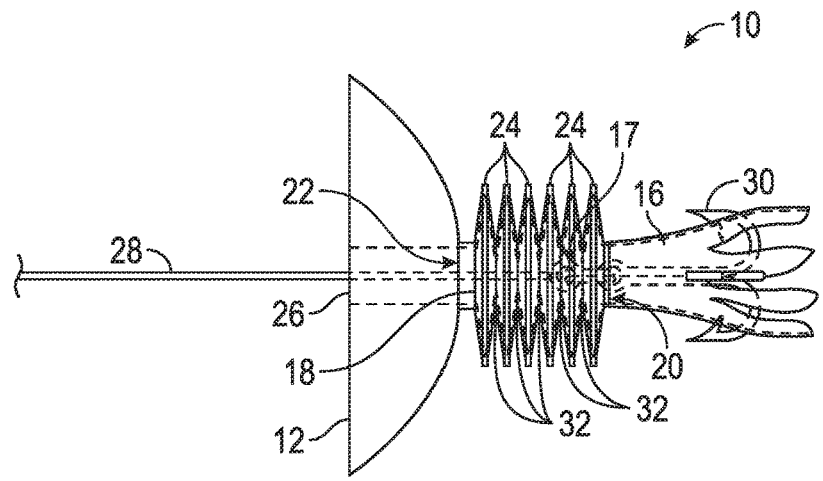

Looking at FIGS. 8 and 9, the contracting fishing lure (10) is configured so that when it is cast and retrieved (e.g., reeled in) by an angler, the head portion (12) leads and water flows through the channel (22) of the body portion (14) in a direction opposite to the direction in which the fishing (10) lure travels through the water. While lying in the water and the fishing line (28) is slack, the fishing lure (10) assumes a non-contracted first position as depicted in FIG. 8. While moving through the water after tension or force has been placed on the fishing line (28) (e.g., the fishing lure (10) is reeled in by the angler, or the fishing line (28) is pulled, twitched, jerked, or yanked), the fishing lure (10) transitions to a contracted second position where the series of flexible ridges (24) and valleys (32) contract or squeeze together, as illustrated in FIG. 9. When the fishing line (28) becomes slack once again, the fishing lure (10) returns to the non-contracted first position as depicted in FIG. 8, thus, mimicking the natural movement of live bait to attract fish. Because the fishing lure (10) fills with water as it enters the water, water rushes in and out of the fishing lure (10) via the transition from the non-contracted first position to the contracted second position and back to the non-contracted first position. The contracting fishing lure (10) attracts fish by transitioning from the non-contracted first position to the contracted second position before a fish bites or strikes the contracting fishing lure (10), although the fish may bite or strike the contracting fishing lure (10) at any time. The fishing lure (40) of the present invention may also be retrieved in a "walk the dog" fashion which would cause a darting side-to-side action.

There is a significant difference in overall length of the contracting fishing lure (10) between the non-contracted first position (FIG. 8) and the contracted second position (FIG. 9) to better attract fish. For instance, the overall length of the contracting fishing lure (10) in the non-contracted first position may decrease 25-75% as it transitions to the contracted second position. Thus, the overall length of the contracting fishing lure (10) in the contracted second position may be 25-75% less than the overall length of the contracting fishing lure (10) in the non-contracted first position. This significant difference in overall length of the contracting fishing lure (10) between the non-contracted first position and the contracted second position may cause the flexible ridges (24) to touch and the valleys (32) to disappear. A further example of this significant difference in overall length may be demonstrated by the location of the means of attachment (17) for the fishing line (28) to the fishing hook (30). As illustrated in FIG. 8, the means for attachment (17) is located towards the tail end of body portion (14) while the contracting fishing lure (10) is in the non-contracted first position. However, as illustrated in FIG. 9, the means for attachment (17) extends further into and towards the middle of body portion (14) while the contracting fishing lure (10) is in the contracted second position. This notable location change for the means of attachment (17) further demonstrates the significant difference in overall length of the fishing lure (10) between the non-contracted first position and the contracted second position. The series of flexible ridges (24) and valleys (32) are important to the design of the contracting fishing lure (10) of the present invention by creating an accordion-like movement that maximizes the size of contraction and causes the contracting fishing lure (10) to significantly decrease in overall length to better attract fish. The contraction is magnified by the increased resistance exerted by the cup, bowl, or flat-shaped head portion (12) against the water as the fishing lure is retrieved or jigged by an angler.

Figure 10:
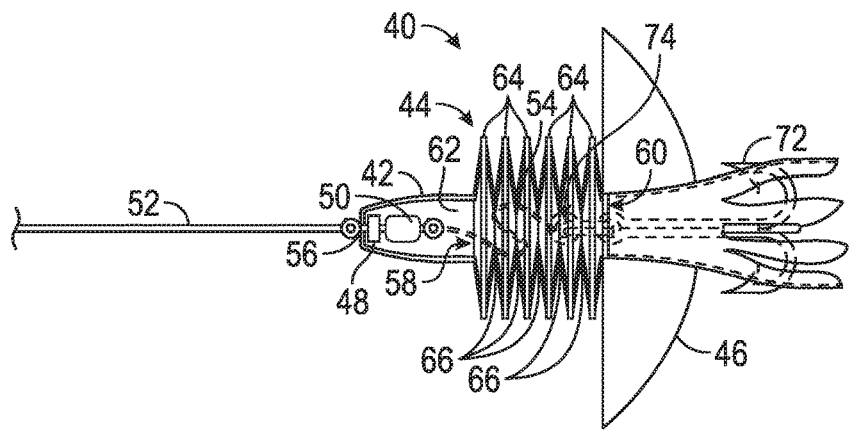

FIG. 10 illustrates a non-expanded view of yet another aspect of the present invention, an expanding fishing lure (40). The expanding fishing lure (40) has a head portion (42), a body portion (44), and a tail portion (46). The head portion (42) may be rounded in shape, flat, tapered to a point, bullet-shaped, and/or resemble a particular fish prey. The head portion (42) may comprise a sinker, a weight, or a light-weight material that floats (e.g., plastic, wood, etc.). The head portion (42) may further comprise a spinner, a bill, a lip, and/or a bib. The head portion (42) includes an opening (56) extending through the head portion (42). The head portion (42) may reside adjacent the body portion (44), wherein the head portion (42) and body portion (44) may be separate or integral. Moreover, the head portion (12) may move independently from the body portion (14).

As further shown in FIG. 10, the body portion (44) has a first open end (58) and an opposite second open end (60) exiting into the adjacent tail portion (46). The opening (56) in the head portion (42) may be aligned with the first open end (58) of the body portion (44). A channel (62) extends longitudinally through the first open end (58) to the second open end (60) of the body portion (44). The channel (62) is configured for water to flow into the first open end (58) of the body portion (44), continue through the body portion (44), and exit the second open end (60) into the tail portion (46). The body portion (44) may be a continuous hollow tube, wherein the tubular design is not limited to a circle diameter but may comprise diametrical shapes such as a square, oval, pentagon, octagon, or others. The body portion (44) may be comprised of elastic material and may have a series of flexible ridges (64) and valleys (66) extending around the body portion (44), resembling an accordion and/or caterpillar.

The tail portion (46) may be cup-shaped, bowl-shaped, or flat-shaped. A diameter of the tail portion (46) may be up to ten times larger than a diameter of the body portion (44) to increase water resistance as the fishing lure is drawn through water. The tail portion (46) may also be the same diameter as the body portion or smaller in diameter than the body portion. The tail portion (46) may also be strengthened to include reinforcing ribs, thick walls, and/or rigid or semi-rigid materials (not shown). Additionally, the tail portion (46) may include tentacles, a sickle, a plurality of segments, a fin or a plurality of fins, a plurality of elongated streamers forming a skirt, a plurality of legs, a plurality of claws, a plurality of antennas, a tail, any combination of the foregoing, and/or other types of appendages that resemble fish prey commonly used in the industry. The tail portion (46) may be optional, wherein the fishing lure (40) may be fished without a tail (46). The tail portion (46) may also be interchanged with the head portion (42) in the fishing lure (40).

Figure 11:
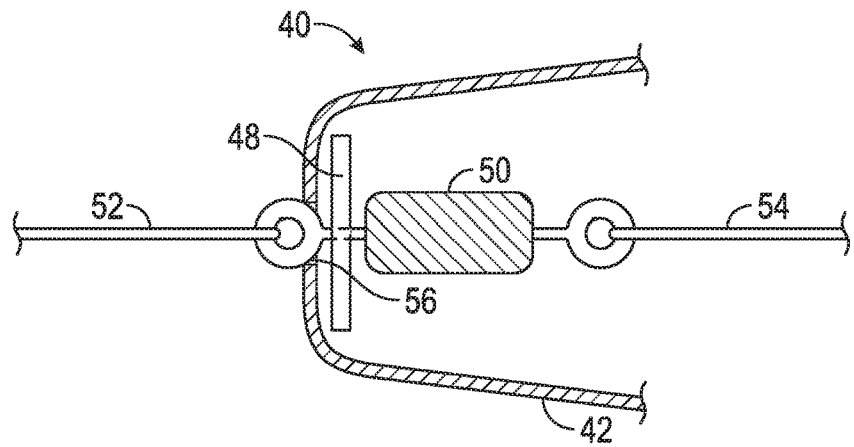
Figure 12:
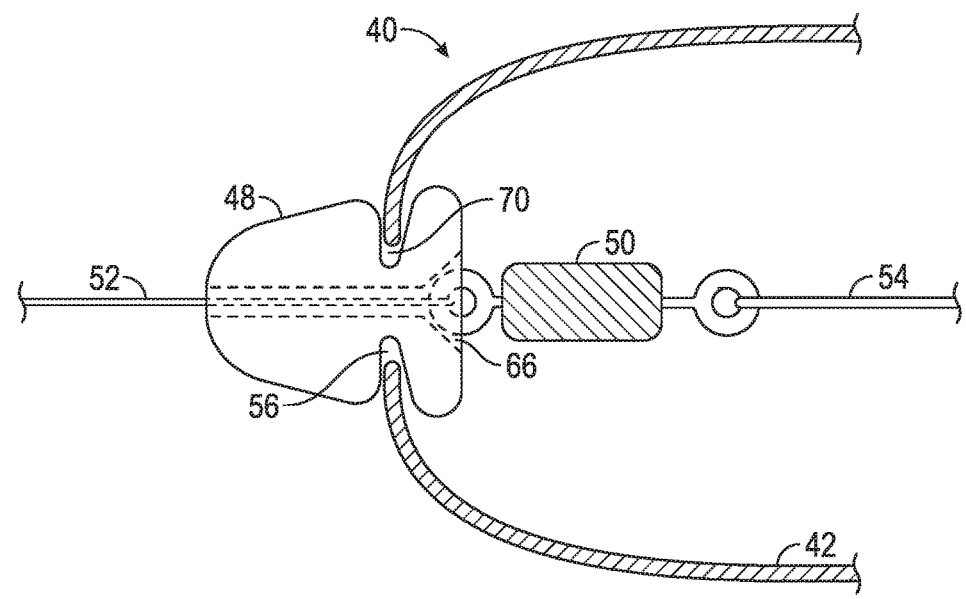

As illustrated in FIGS. 11-12, the expanding fishing lure (40) of the present invention may include a stop (48), a swivel (50), a first fishing line (52), and a second fishing line (54). The first fishing line (52) or lead line is attached to the swivel (50), wherein the swivel (50) may comprise at least two rings connected by a pivoting joint. The swivel (50) may be of the kind standardly used in the fishing industry, such as power swivels, barrel swivels, brass swivels, snap swivels, ball-bearing swivels, or any combination of the foregoing. It is contemplated that other configurations equivalent to a swivel could also be used in the present invention. Thus, the term "swivel" may incorporate equivalents such as a ring, a bent wire with rings at each end, and other configurations typically used in the industry. The stop (48) may be integrally formed with the swivel (50), incorporated as a separate piece, or integrally formed with the head portion (42).

FIG. 11 illustrates an expanding fishing lure (40) of the present invention that may be used for topwater fishing. A portion of the swivel (50) may extend through a hole in the stop (48) and outside the head portion (42) through opening (56) wherein it attaches to the first fishing line (52). The stop (48) resides inside the head portion (42) and may be a thin washer and/or shaped to fit inside the head portion (42). The stop (48) may also be comprised of a lightweight, rigid material such as plastic, aluminum, wood, or metal. The stop (48) prevents the swivel (50) from being pulled completely through opening (56) of the head portion (42) as an angler is casting and/or retrieving the expanding fishing lure (40).

FIG. 12 illustrates an expanding fishing lure (40) of the present invention that may be used for midwater or bottom fishing. The swivel (50) may reside inside the head portion (42) and/or body portion (44), wherein it attaches to the first fishing line (52) through a hole in the stop (48) and the opening (56) of the head portion (42). The swivel (50) resides adjacent the stop (48), wherein the stop (48) may include a recess (66) that allows the swivel (50) to rotate freely against the stop (48) and further provide room for a knot in the fishing line, attaching the fishing line to the swivel, to prevent abrasion. The stop (48) may be comprised of a sinker or weight of heavy metal or plastic to facilitate midwater or bottom fishing. Alternatively, the stop (48) may comprise a light-weight material that floats (e.g. plastic, wood, etc.) wherein the expanding fishing lure (40) acts as a topwater fishing lure. The stop (48) may be rounded in shape, flat, tapered to a point, bullet-shaped, and/or resemble a particular fish prey. The stop (48) may include a groove (70) extending around the stop to assist in securing the opening (56) of the head portion (42) around the stop (48). The opening (56) of the head portion (42) may be smaller in diameter than a diameter of the stop (48). The smaller diameter allows the opening (56) of the head portion (42) to fit tightly around the stop (48) via the groove (70) for a secure fit and seal. The stop (48) prevents the swivel (50) from being pulled completely through opening (56) of the head portion (42) as an angler is casting and/or retrieving the expanding fishing lure (40).

As illustrated in FIGS. 10-13, the second fishing line (54) is connected to the swivel (50) opposite the first fishing line (52). The second fishing line (54) continues through channel (62), second open end (20) of the body portion (14), and extends beyond the tail portion (46) where it is attached to a fishing hook (72) via a means of attachment (74) (e.g., by a fishing knot, ring, snap, or other means of attaching a fishing hook commonly used in the fishing industry). The fishing hook (72) may be a single, double, treble, or quad hook(s). The fishing hook (72) may extend outside a diameter of the body portion (44) or alternatively be concealed by the tail portion (46) so that the fishing lure (40) appears more life-like. The expanding fishing lure (40) may further act as a weedless lure by embedding barbs of the fishing hook (72) into the body portion (44). The fishing hook (72) may also be weighted to assist in vertical jigging. A person skilled in the art will recognize that various sizes of body portions, weights, and hooks may be fabricated and utilized for different types and sizes of fish.

Figure 13:
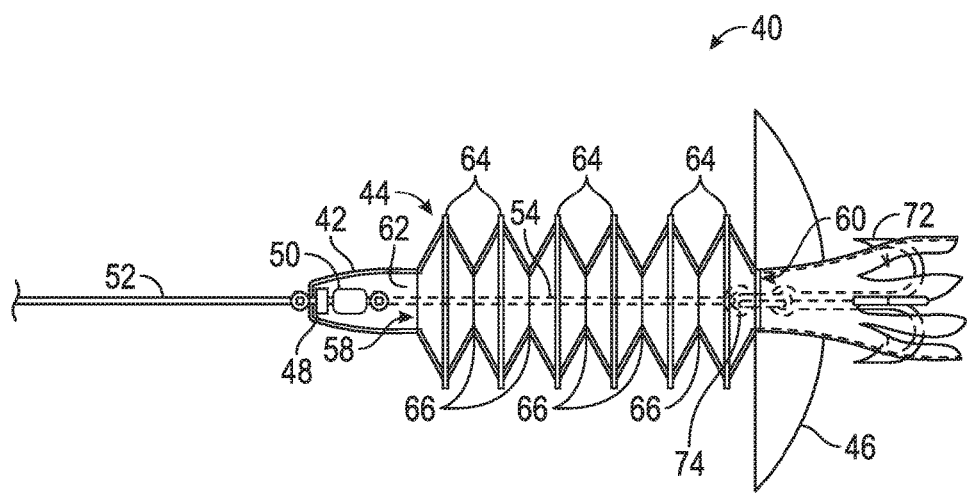

Looking at FIGS. 10 and 13, the fishing lure (40) is configured so that when it is cast and retrieved (e.g., reeled in) by an angler, the head portion (42) leads and water flows through the channel (62) of the body portion (44) in a direction opposite to the direction in which the fishing (40) lure travels through the water. While lying in the water and the first fishing line (52) is slack, the fishing lure (40) assumes a non-expanded first position as depicted in FIG. 10. While moving through the water after tension or force has been placed on the first fishing line (52) (e.g., the fishing lure (40) is reeled in by the angler, or the first fishing line (52) is pulled, twitched, jerked, or yanked), the fishing lure (40) transitions to an expanded second position where the series of flexible ridges (64) and valleys (66) expand, as illustrated in FIG. 13. When the first fishing line (52) becomes slack once again, the fishing lure (40) returns to the non-expanded first position as depicted in FIG. 10, thus, mimicking the natural movement of live bait to attract fish. Because the fishing lure (40) fills with water as it enters the water, water rushes in and out of the fishing lure (40) via the transition from the contracted first position to the expanded second position and back to the contracted first position. The expanding fishing lure (40) attracts fish by transitioning from the non-expanded first position to the expanded second position before a fish bites or strikes the expanding fishing lure (40), although the fish may bite or strike the contracting fishing lure (10) at any time. The fishing lure (40) of the present invention may also be retrieved in a "walk the dog" fashion which would cause a darting side-to-side action.

There is a significant difference in overall length of the expanding fishing lure (40) between the non-expanded first position (FIG. 10) and the expanded second position (FIG. 13) to better attract fish. For instance, the overall length of the expanding fishing lure (40) in the non-expanded first position may increase 25-75% as it transitions to the expanded second position. Thus, the overall length of the expanding fishing lure (40) in the expanded second position may be 25-75% greater than the overall length of the expanding fishing lure (40) in the non-expanded first position. An example of this significant difference may be demonstrated by the location of the means of attachment (74) for the second fishing line (54) to the fishing hook (72). As illustrated in FIG. 10, the means for attachment (74) may extend further into and towards the middle of body portion (44) while the expanding fishing lure (40) is in the non-expanded first position. However, as illustrated in FIG. 13, the means for attachment (74) is located towards the tail end of body portion (44) while the expanding fishing lure (40) is in the expanded second position. This notable location change for the means of attachment (74) further demonstrates the significant difference in overall length of the fishing lure (40) between the non-expanded first position and the expanded second position. The series of flexible ridges (64) and valleys (66) are important to the design of the expanding fishing lure (40) of the present invention by creating an accordion-like movement that maximizes the size of expansion and causes the expanding fishing lure (40) to significantly increase in overall length to better attract fish. The expansion is magnified by the increased resistance exerted by the cup, bowl, or flat-shaped tail portion (46) against the water as the fishing lure is retrieved or jigged by an angler.

Figure 14:
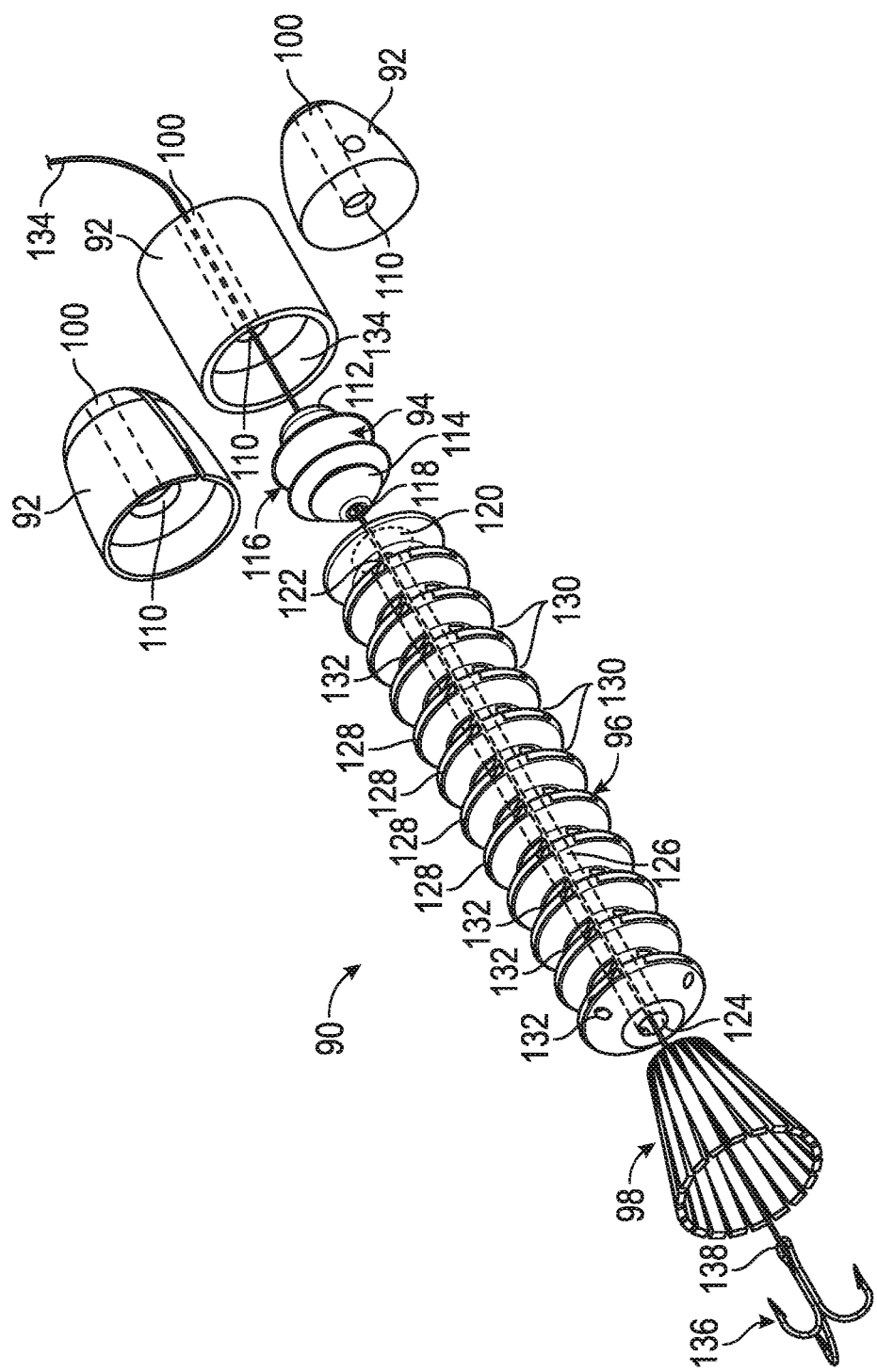

FIG. 14 illustrates an exploded assembly view of another aspect of a contracting or expanding fishing lure (90) of the present invention. The contracting or expanding fishing lure (90) has a head portion (92), at least one insert (94), a body portion (96) and a tail portion (98). The head portion (92) may be rounded in shape, flat, tapered to a point, bullet-shaped and/or resemble a particular fish prey. Alternatively, the head portion (92) may be cup-shaped, bowl-shaped or flat-shaped. The head portion (92) may further comprise a spinner, a bill, a lip, and/or a bib (not shown). The head portion (92) may be the same diameter as the body portion (96) or smaller in diameter than the body portion (96). Alternatively, the diameter of the head portion (92) may be up to ten times larger than a diameter of the body portion (96) to increase water resistance as the fishing lure (90) is drawn through water. The head portion (92) may be strengthened to include a plurality of reinforcing ribs, thick walls, and/or rigid or semi-rigid materials (not shown). The head portion (92) may comprise a sinker, a weight, or a light-weight material that floats (e.g., plastic, wood, etc.). The head portion (92) may include an opening (100) extending through the head portion (92). The head portion (92) may also comprise a button-hole (110) configured to connect the head portion (92) to the insert (94). As depicted in FIG. 14, a variety of uniquely-shaped head portions (92) may be interchangeable and utilized by the present invention.

Figure 14A:
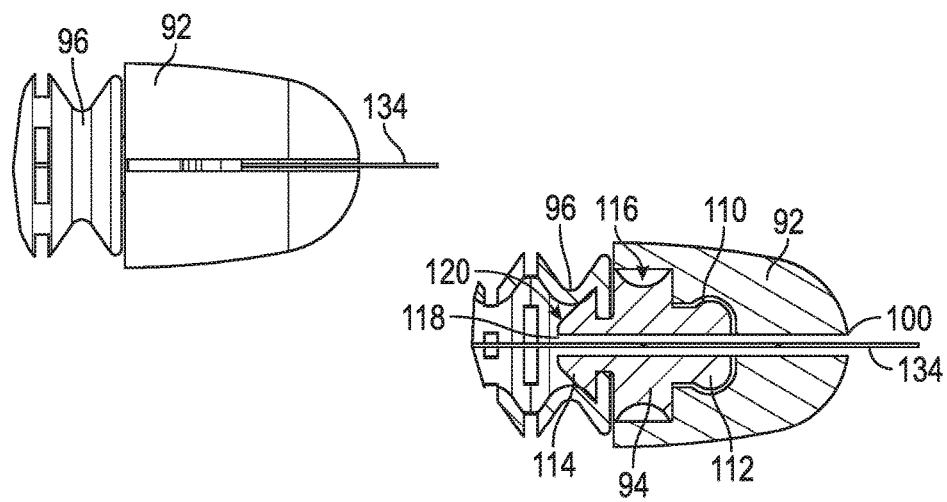
FIGS. 14A and B are cross-sectional and exterior views of different head portions connected via an insert to the contracting or expanding fishing lure of FIG. 14.
Figure 14B:
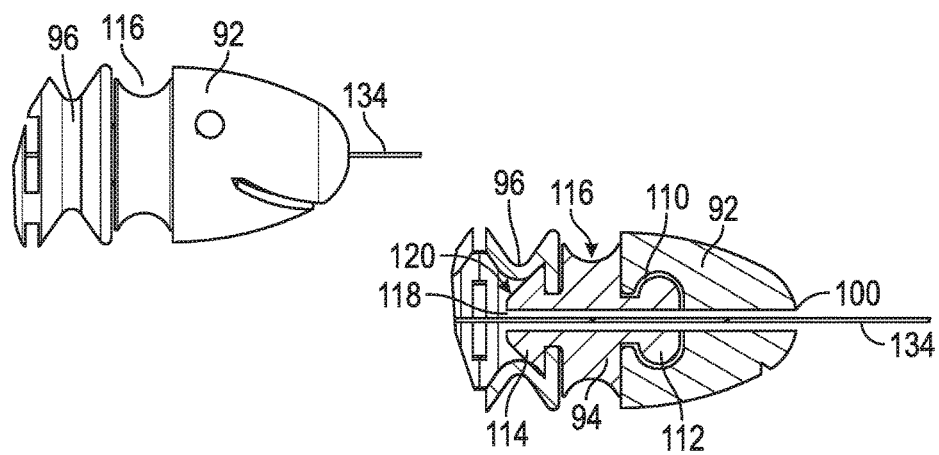

Illustrated in FIGS. 14A and 14B, the insert (94) may comprise a first button (112) and an opposite second button (114). The first button (112) is configured to press-fit or snap into the button-hole (110) of the head portion (92) to effectively connect the head portion (92) to the insert (94). Thus, the head portion (92) may be conveniently connected to or removed from the insert (94). The insert (94) may further comprise a groove (116) extending around the insert (94) wherein an optional metal wire (not shown) may be wrapped around the groove (116) to provide additional weight to the fishing lure (90) to facilitate midwater or bottom fishing. As depicted in FIG. 14A, the groove (116) may be covered by the head portion (92). Alternatively, the groove (116) may remain uncovered by the head portion (92) as depicted in FIG. 14B. The insert (94) may be formed of weighted material that sinks or light-weight material that floats in the water. The insert (94) may include an opening (118) extending through the insert (94) configured to permit a fishing line (134) to pass through. The insert (94) is configured to maintain the fishing line (134) in a straight configuration inside the fishing lure (90) to reduce sideways deflection of the fishing lure while traveling through water. The second button (114) of the insert (94) may be configured to press-fit or snap into a button-hole (120) of the body portion (96) to effectively connect the insert (94) and the head portion (92) to the body portion (96). Thus, the body portion (96) may be conveniently connected to or removed from the insert (94). It is also contemplated by the present invention that conversely the head and body portions may comprise buttons configured to press-fit or snap into button-holes on the insert to effectively connect the insert to the head and body portions (not shown).

Further shown in FIG. 14, the body portion (96) may have a first open end (122) and an opposite second open end (124) exiting towards the adjacent tail portion (98). The opening (100) in the head portion (92) along with the opening (118) in the insert (94) may be aligned with the first open end (122) of the body portion (96). A channel (126) may extend longitudinally through the first open end (122) to the second open end (124) of the body portion (96). The body portion (96) may be a continuous hollow tube, wherein the tubular design is not limited to a circle diameter but may comprise diametrical shapes such as a square, oval, pentagon, octagon, or others. The body portion (96) may be comprised of elastic material and may have a series of flexible ridges (128) and valleys (130) extending around the body portion (96), resembling an accordion and/or caterpillar. The series of flexible ridges (128) and valleys (130) may further comprise a plurality of holes (132) extending therethrough to permit water to pass in and out of the body portion (96) while the fishing lure (90) is contracting or expanding. The plurality of holes (132) are optional and are configured to aid the fishing lure (90) in contracting or expanding as it travels through the water. As illustrated in FIG. 14, the plurality of holes (132) may comprise vertical slits extending through the body portion (96), however, it is intended that other hole shapes may also be utilized by the present invention such as horizontal slits, circular holes, oval holes, etc.

Yet further shown in FIG. 14, the tail portion (98) may include tentacles, a sickle, a plurality of segments, a fin or a plurality of fins, a plurality of elongated streamers forming a skirt, a plurality of legs, a plurality of claws, a plurality of antennas, a tail, any combination of the foregoing, and/or other types of appendages that resemble fish prey commonly used in the industry. Alternatively, the tail portion (98) may be cup-shaped, bowl-shaped, or flat-shaped. A diameter of the tail portion (98) may be up to ten times larger than a diameter of the body portion (96) to increase water resistance as the fishing lure is drawn through water. Alternatively, the tail portion (98) may be the same diameter as the body portion or smaller in diameter than the body portion. The tail portion (98) may also be strengthened to include reinforcing ribs, thick walls, and/or rigid or semi-rigid materials (not shown). Optionally, an additional insert (not shown) may be utilized to connect the tail portion (98) to the body portion (96). A variety of uniquely-shaped tail portions (98) may be interchangeable and utilized by the present invention. The tail portion (98) may be optional, wherein the fishing lure (90) may be fished without a tail (98). Moreover, the tail portion (98) may be interchangeable with the head portion (92) to facilitate different configurations of the contracting or expanding fishing lure (90).

Further shown in FIG. 14, a fishing line (134) may be drawn through the opening (100) in the head portion (92), through the opening (118) in the insert (94), continued through the first open end (122) of the body portion (96), through the channel (126) of the body portion (96), continued through the second open end (124), and extended beyond the tail portion (98) where it is attached to a fishing hook (136) via a means of attachment (138) (e.g., by a fishing knot, ring, snap, or other means of attaching a fishing hook commonly used in the fishing industry). The fishing hook (136) may be a single, double, treble or quad hook(s). The fishing hook (136) may extend outside a diameter of the body portion (96) or the fishing hook (136) may be concealed by the tail portion (98) so that the fishing lure (90) appears more life-like. The contracting or expanding fishing lure (90) may also act as a weedless lure by embedding barbs of the fishing hook (136) into the body portion (96) and/or concealing the hook (136) in the tail portion (98). The fishing hook (136) may also be weighted to assist in vertical jigging. A person skilled in the art will recognize that various sizes of body portions, weights, and hooks may be fabricated and utilized for different types and sizes of fish.

FIG. 15 illustrates a cross-sectional view of the contracting or expanding fishing lure (90) of the present invention, wherein the fishing lure is configured to contract. In particular, the fishing lure (90) is configured so that when it is cast and retrieved (e.g., reeled in) by an angler, the head portion (92) leads and water flows through the channel (126) of the body portion (96) in a direction opposite to the direction in which the fishing (90) lure travels through the water. While lying in the water and the fishing line (134) is slack, the fishing lure (90) assumes a non-contracted first position as similarly depicted in FIG. 2. While moving through the water after tension or force has been placed on the fishing line (134) (e.g., the fishing lure (90) is reeled in by the angler, or the fishing line (134) is pulled, twitched, jerked, or yanked), the fishing lure (90) transitions to a contracted second position where the series of flexible ridges (129) and valleys (130) contract or squeeze together, as similarly depicted in FIG. 3. When the fishing line (134) becomes slack once again, the fishing lure (90) returns to the non-contracted first position, thus, mimicking the natural movement of live bait to attract fish. Because the fishing lure (90) fills with water as it enters the water, water rushes in and out of the fishing lure (90) via the plurality of holes (132) as the fishing lure (90) transitions from the non-contracted first position to the contracted second position and back to the non-contracted first position. The fishing lure (90) attracts fish by transitioning from the non-contracted first position to the contracted second position and back again, although the fish may bite or strike the fishing lure (90) at any time. The fishing lure (90) may also be retrieved in a "walk the dog" fashion which would cause a darting side-to-side action.

FIG. 16 illustrates a cross-sectional view of the contracting or expanding fishing lure (90) of the present invention, wherein the fishing lure is configured to expand. The fishing lure (90) may include a swivel (140), a first fishing line (142) and a second fishing line (144). The first fishing line (142) or lead line is attached to the swivel (140), wherein the swivel (140) may comprise at least two rings connected by a pivoting joint. The swivel (140) may be of the kind standardly used in the fishing industry, such as power swivels, barrel swivels, brass swivels, snap swivels, ball-bearing swivels, or any combination of the foregoing. It is contemplated that other configurations equivalent to a swivel could also be used in the present invention, such as a ring, a bent wire with rings at each end, and other configurations typically used in the industry. The swivel (140) may reside inside the body portion (96) wherein it attaches to the first fishing line (142) through the opening (118) of the insert (94) and the opening (100) of the head portion (92). The swivel (140) resides adjacent the insert (94), wherein the insert (94) may include a recess (not shown) that allows the swivel (140) to rotate freely against the insert (94) and further provide room for a knot in the fishing line—attaching the fishing line to the swivel—to prevent abrasion. The insert (94) prevents the swivel (140) from being pulled through opening (100) of the head portion (92) as an angler is casting and/or retrieving the expanding fishing lure (90).

Further shown in FIG. 16, the second fishing line (144) is connected to the swivel (140) opposite the first fishing line (142). The second fishing line (144) continues through channel (126), second open end (124) of the body portion (96), and extends beyond the tail portion (98) where it is attached to the fishing hook (136) via means of attachment (138) (e.g., by a fishing knot, ring, snap, or other means of attaching a fishing hook commonly used in the fishing industry). Notably, the second fishing line (144) contains extra slack to allow the fishing lure (90) to expand. In particular, the fishing lure (90) is configured so that when it is cast and retrieved (e.g., reeled in) by an angler, the head portion (92) leads and water flows through the channel (126) of the body portion (96) in a direction opposite to the direction in which the fishing (90) lure travels through the water. While lying in the water and the first fishing line (142) is slack, the fishing lure (90) assumes a non-expanded first position as similarly depicted in FIG. 10. While moving through the water after tension or force has been placed on the first fishing line (142) (e.g., the fishing lure (90) is reeled in by the angler, or the first fishing line (142) is pulled, twitched, jerked, or yanked), the fishing lure (90) transitions to an expanded second position where the series of flexible ridges (128) and valleys (130) expand, as similarly depicted in FIG. 13. When the first fishing line (142) becomes slack once again, the fishing lure (90) returns to the non-expanded first position, thus, mimicking the natural movement of live bait to attract fish. Because the fishing lure (40) fills with water as it enters the water, water rushes in and out of the fishing lure (40) via the plurality of holes (132) as the fishing lure (90) transitions from the contracted first position to the expanded second position and back to the contracted first position. The expanding fishing lure (40) attracts fish by transitioning from the non-expanded first position to the expanded second position and back again, although the fish may bite or strike the fishing lure (90) at any time. The fishing lure (90) of the present invention may also be retrieved in a "walk the dog" fashion which would cause a darting side-to-side action.

In both aspects of the expanding or contracting fishing lure (90) as shown in FIGS. 15 and 16, there is a significant difference in overall length of the fishing lure (90) between the first positions and the second positions to better attract fish. For instance, the overall length of the fishing lure (90) may fluctuate between 25-75% between positions. This significant difference in overall length of the fishing lure (90) between the first and second positions may cause the flexible ridges (128) to touch and the valleys (130) to disappear. A further example of this significant difference in overall length may be demonstrated by the location of the means of attachment (138) for the fishing line (134) to the fishing hook (136), when the fishing lure is configured to contract. As depicted in FIG. 15, the means for attachment (138) is located towards the tail end of body portion (96) while the fishing lure (90) is in a non-contracted first position. However, as similarly depicted in FIG. 3, the means for attachment (138) extends further into and towards the middle of body portion (96) while the contracting fishing lure (90) is in the contracted second position. This notable location change for the means of attachment (138) further demonstrates the significant difference in overall length of the fishing lure (90) between the non-contracted first position and the contracted second position. The series of flexible ridges (128) and valleys (130) are important to the design of the contracting fishing lure (90) of the present invention by creating an accordion-like movement that maximizes the size of contraction or expansion and causes the fishing lure (90) to significantly change in overall length to better attract fish.

With regard to all aspects of the present invention, the body portion and tail portion may be formed separately or integrally from a non-toxic, silicone, rubber, and/or plastic material, such as a vinyl plastisol (polyvinyl chloride) dispersion grade resin in a suitable solvent or plasticizer. The plastic material may be hard and/or soft, flexible, non-transparent, partially transparent, completely transparent, contain various colors, patterns, and/or metallic flakes. The plastic material may also be of varying thicknesses throughout the fishing lure. The plastic material at the ridges and valleys may be thinner as compared to the plastic material forming the rest of the contracting or expanding fishing lure. Thus, the thinner plastic material at the ridges and valleys increases flexibility in these areas and assists in enabling the fishing lure to contract to mimic the natural movement of live bait. It is contemplated that the body portion may be continuous. In the present invention "continuous" means: unbroken without gaps or breaks in body portion as the fishing lure contracts or expands from the first position to the second position. Moreover, fragrances (e.g., cod liver oil, fish oil, fish attractant tablets, and gel scents) may be incorporated and/or applied to the fishing lure of the present invention to further attract fish. It is also contemplated that a plurality of different shapes, sizes and colors of head portions, body portions and tail portions may be utilized and interchanged in the fishing lure of the present invention to create an infinite number of possible configurations that may be sold separately and/or incorporated as such into kits.

Figure 17:
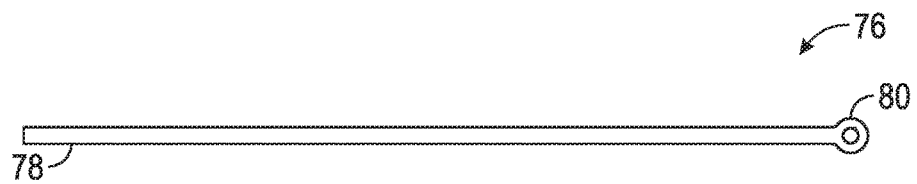

According to a further aspect of the present invention a method of fishing using an expanding or contracting fishing lure is provided. The method includes providing a fishing rod and reel. The method further includes providing a fishing line with a first end attached to the rod and reel and an opposite free second end. The method further includes providing an aspect of the fishing lure as explained previously with respect to FIGS. 1-16. As shown in FIG. 17, the method further comprises providing a stringing tool (76), wherein the stringing tool (76) may include a handle (78) at one end and a loop (80) at an opposite end. The stringing tool (76) may be comprised of a thin piece of metal or plastic that is longer in length than the body portion (96) of the expanding or contracting fishing lure of the present invention. The loop (80) may be formed by bending one end of the thin piece of metal or plastic over, or punching a hole in the thin piece of metal or plastic. An angler may thread the fishing line through the loop (80) and may use the handle (78) to push or pull the fishing line through the channel of the fishing lure to attach it to the hook or to the swivel. The free second end of the fishing line is then attached to the fishing lure as illustrated in FIGS. 1-16. The method next involves placing the fishing lure into a body of water by use of casting with a fishing rod and reel, or dropping the fishing lure into the water for jigging. An angler retrieves or jigs the fishing lure in a manner so that the fishing lure contracts or expands to mimic the appearance of live bait to attract fish. This manner may include reeling in the fishing line, or pulling, twitching, jerking, or yanking the fishing line. The angler may continually retrieve, cast, or jig the fishing lure while fishing. Additional steps may also be incorporated into the method such as applying or incorporating fragrances (e.g., cod liver oil, fish oil, fish attractant tablets, and gel scents) to the fishing lure to further attract fish.

The expanding or contracting fishing lure of the present invention and method of fishing using the fishing lure are universally applicable to fishing rods and reels of all shapes and sizes, makes, models, and manufacturers. Furthermore, while intended for large and smallmouth bass and northern pike, the expanding or contracting fishing lure of the present invention may be used for fishing all manner of freshwater and saltwater fish. Although the invention has been described and illustrated with respect to preferred aspects thereof, it is not to be so limited since changes and modifications may be made therein which are within the full intended scope of the invention.

What is claimed is:

1. A contracting or expanding fishing lure, comprising:
   a continuous body portion, wherein the body portion comprises a first open end and an opposite second open end;
   a channel extending longitudinally through the body portion;
   a series of flexible ridges and valleys extending around the body portion;
   a head portion;
   an insert configured to removably connect the head portion to the body portion;
   a tail portion adjacent the second open end of the body portion and opposite the head portion;
   a fishing hook;
   a fishing line, wherein the fishing line is drawn through an opening in the head portion, further drawn through an opening in the insert and through the channel extending longitudinally through the body portion, continued through the tail portion, and attached to the fishing hook via a means of attachment;
   a non-contracted first position, wherein the body portion is in the non-contracted first position when the fishing line is slack;
   a contracted second position, wherein the body portion is in the contracted second position under action of water pressure when the fishing line is reeled in by an angler; and
   a significant difference in overall length of the fishing lure between the non-contracted first position and the contracted second position to attract the attention of fish;
   wherein the fishing lure transitions from the non-contracted first position to the contracted second position and back to the non-contracted first position as the fishing lure is drawn through water to mimic the appearance of live bait to attract fish.

2. The contracting or expanding fishing lure of claim 1, wherein an overall length of the fishing lure in the contracted second position is 25-75% less than an overall length of the fishing lure in the non-contracted first position.

3. The contracting or expanding fishing lure of claim 2, wherein the overall length of the fishing lure in the contracted second position is 30-50% less than the overall length of the fishing lure in the non-contracted first position.

4. The contracting or expanding fishing lure of claim 1, wherein the insert comprises:
   a first button;
   an opposite second button; and
   a groove extending around the insert.

5. The contracting or expanding fishing lure of claim 4, further comprising:
   a button-hole in the head portion;
   a button-hole in the body portion;
   the first button of the insert configured to press-fit or snap into the button-hole of the head portion;
   the second button of the insert configured to press-fit or snap into the button-hole of the body portion; and
   an optional wire wrapped around the groove of the insert to provide additional weight to the fishing lure to facilitate midwater or bottom fishing.

6. The contracting or expanding fishing lure of claim 1, wherein the fishing lure is a weedless lure with barbs of the fishing hook embedded in the body portion.

7. The contracting or expanding fishing lure of claim 1, wherein the series of flexible ridges and valleys comprise a plurality of holes extending therethrough to permit water to pass in and out of the body portion while the fishing lure is contracting or expanding.

8. The contracting or expanding fishing lure of claim 1, wherein the insert is configured to maintain the fishing line in a straight configuration inside the fishing lure to reduce sideways deflection of the fishing lure while traveling through water.

9. The contracting or expanding fishing lure of claim 1, further comprising:
   a plurality of different shapes, sizes and colors of head portions;
   a plurality of different shapes, sizes and colors of body portions; and a plurality of different shapes, sizes and colors of tail portions;
wherein the plurality of different shapes, sizes and colors of head portions, body portions and tail portions are interchangeable in the fishing lure to create an infinite number of possible configurations;
wherein the fishing lure and the plurality of different shapes, sizes and colors of head portions, body portions and tail portions are incorporated into kits.

10. A contracting or expanding fishing lure, comprising:
a continuous body portion, wherein the body portion comprises a first open end and an opposite second open end;
a channel extending longitudinally through the body portion;
a series of flexible ridges and valleys extending around the body portion;
a head portion;
an insert configured to removably connect the head portion to the body portion;
a tail portion adjacent the second open end of the body portion and opposite the head portion;
a swivel inside the body portion;
a first fishing line;
a second fishing line;
a fishing hook;
a non-expanded first position, wherein the body portion is in the non-expanded first position when the first fishing line is slack;
an expanded second position, wherein the body portion is in the expanded second position under action of water pressure when the first fishing line is reeled in by an angler; and
a significant difference in overall length of the fishing lure between the non-expanded first position and the expanded second position to attract the attention of fish;
wherein the first fishing line is attached to the swivel;
wherein the second fishing line is attached to the swivel opposite the first fishing line;
wherein the second fishing line is drawn through the channel extending longitudinally through the body portion, continued through the tail portion, and attached to the fishing hook via a means of attachment;
wherein the insert prevents the swivel from being pulled completely through an opening in the head portion as an angler is casting and/or retrieving the fishing lure;
wherein the fishing lure transitions from the non-expanded first position to the expanded second position and back to the non-expanded first position as the fishing lure is drawn through water to mimic the appearance of live bait to attract fish.

11. The contracting or expanding fishing lure of claim 10, wherein an overall length of the expanding fishing lure in the expanded second position is 25-75% greater than an overall length of the expanding fishing lure in the non-expanded first position.

12. The contracting or expanding fishing lure of claim 10, wherein the insert comprises:
a first button; and
an opposite second button.

13. The contracting or expanding fishing lure of claim 12, further comprising:
a groove extending around the insert;
an optional wire wrapped around the groove of the insert to provide additional weight to the fishing lure to facilitate midwater or bottom fishing.

14. The contracting or expanding fishing lure of claim 12, further comprising:
a button-hole in the head portion;
a button-hole in the body portion;
the first button of the insert configured to press-fit or snap into the button-hole of the head portion;
the second button of the insert configured to press-fit or snap into the button-hole of the body portion.

15. The contracting or expanding fishing lure of claim 10, wherein the tail portion is flat, cup or bowl-shaped to increase water resistance as the contracting fishing lure is drawn through water.

16. The contracting or expanding fishing lure of claim 15, wherein the fishing lure is a weedless lure with barbs of the fishing hook embedded in the body portion.

17. The contracting or expanding fishing lure of claim 10, wherein the series of flexible ridges and valleys comprise a plurality of holes extending therethrough to permit water to pass in and out of the body portion while the fishing lure is contracting or expanding.

18. The contracting or expanding fishing lure of claim 10, wherein the insert is configured to maintain the fishing line in a straight configuration inside the fishing lure to reduce sideways deflection of the fishing lure while traveling through water.

19. The contracting or expanding fishing lure of claim 1, further comprising:
a plurality of different shapes, sizes and colors of head portions;
a plurality of different shapes, sizes and colors of body portions; and
a plurality of different shapes, sizes and colors of tail portions;
wherein the plurality of different shapes, sizes and colors of head portions, body portions and tail portions are interchangeable in the fishing lure to create an infinite number of possible configurations;
wherein the fishing lure and the plurality of different shapes, sizes and colors of head portions, body portions and tail portions are incorporated into kits.

20. A method of fishing using a contracting or expanding fishing lure, comprising:
providing a fishing rod;
providing a fishing line with a first end attached to the fishing rod and a free second end;
providing the contracting or expanding fishing lure of claim 1 or 10;
providing a stringing tool;
attaching the free second end of the first fishing line to the contracting or expanding fishing lure using the stringing tool;
placing the contracting or expanding fishing lure into water; and
retrieving the contracting or expanding fishing lure in a manner so that when the fishing line is retrieved the fishing lure transitions from the first position to the second position and back to the first position as the fishing lure is drawn through water to mimic the appearance of live bait to attract fish.

* * * * *